N. DE MATTEI.
APPARATUS FOR MAKING COFFEE AND THE LIKE.
APPLICATION FILED NOV. 7, 1919.
1,357,445.                                          Patented Nov. 2, 1920.
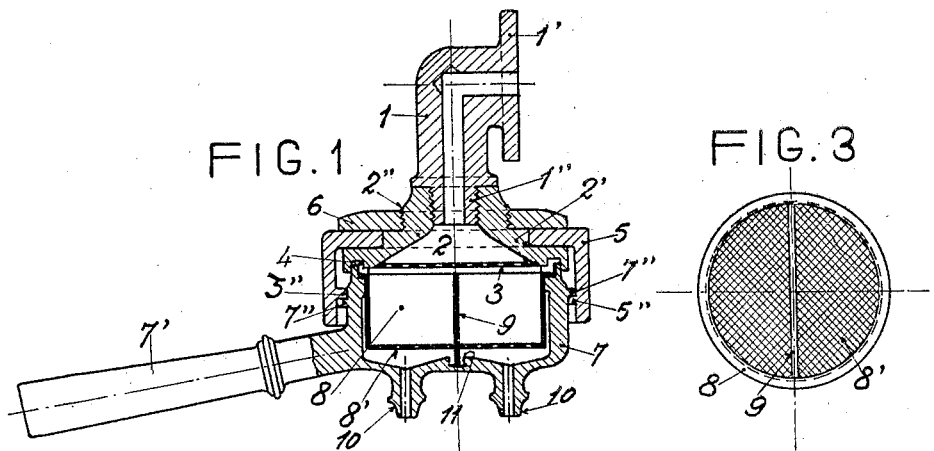
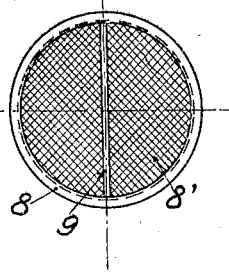
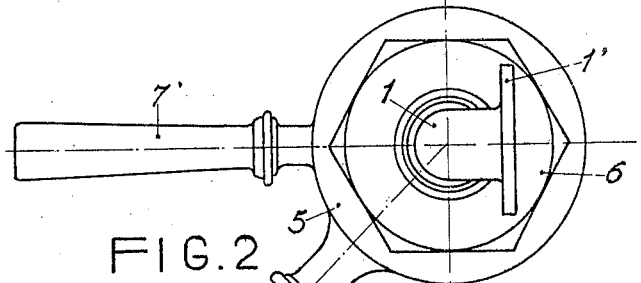
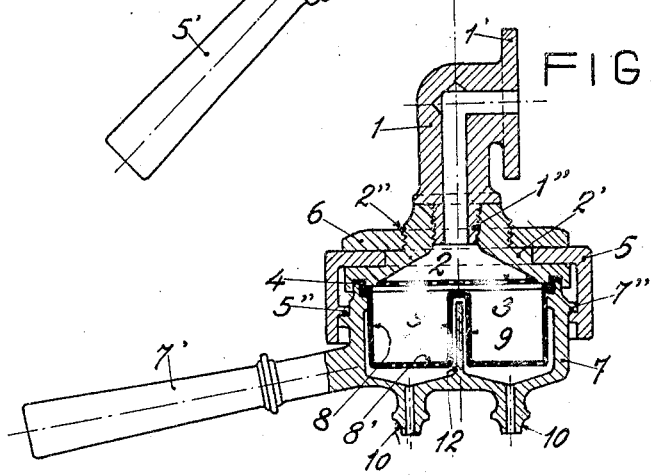
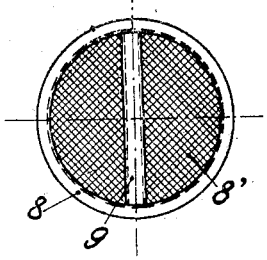
Inventor.
Natale De Mattei

UNITED STATES PATENT OFFICE.

NATALE DE MATTEI, OF TURIN, ITALY.

APPARATUS FOR MAKING COFFEE AND THE LIKE.

1,357,445.  Specification of Letters Patent.  Patented Nov. 2, 1920.

Application filed November 7, 1919. Serial No. 336,514.

*To all whom it may concern:*

Be it known that I, NATALE DE MATTEI, a subject of the King of Italy, residing at Turin, Italy, have invented certain new and useful Improvements in Apparatus for Making Coffee and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a multiple generating group, more particularly for use in apparatus for the instantaneous preparation of infusion of coffee, and the like permitting the simultaneous preparation in one operation only, of several cups of coffee or the like.

The main characteristic feature of the multiple generating group according to the invention consists in this that the receptacle, provided with a perforated bottom or filter mounted inside the removable cup and intended to contain the coffee powder, is subdivided into a plurality of substantially equal compartments by means of one or more partitions, while the bottom of the removable cup, corresponding to each compartment of the receptacle, is provided with as many discharge nozzles.

Owing to this arrangement the mass of the liquid which has traversed the coffee powder contained in the receptacle leaves the bottom of the said receptacle subdivided into as many equal portions as there are compartments in the receptacle. Each of said portions leaves separately through the corresponding discharge nozzle of the cup in order to be received in one of a plurality of cups arranged below the generating group.

For the purpose of insuring the exact adjusting of the receptacle into the removable cup so that each compartment of the said receptacle may be exactly superposed to the corresponding discharge nozzle of the cup, the partitions of the receptacle project slightly underneath the bottom of the latter and come in engagement with grooves provided in the bottom of the cup; or, the said partitions are hollow and in the bottom of the removable cup there are provided wings or ribs engaging with the cavity of the corresponding partition.

Some constructional forms of the said generating group are shown, by way of example, in the accompanying drawing in which:—Figure 1 shows a first form of the whole of the group in vertical section;—Fig. 2 is a plan view of the same;—Fig. 3 shows the receptacle in plan view;—Fig. 4 shows a second form of the whole of the group in vertical section;—Fig. 5 shows the corresponding receptacle in plan view.

The generating group according to the first form of construction (see Figs. 1 to 3) comprises the connection 1 which by means of its lateral flange 1' may be connected to the water and steam inlet pipe which in its turn may be connected to the boiler through a suitable cock.

The hollow piece 2 which is funnel shaped is screwed to the lower screwthreaded end 1'' of the connection 1, is closed at the lower part by the perforated disk 3 and provided with a suitable packing 4, made of rubber, asbestos or any other suitable material, inserted in a suitable annular recess of the member 2. On a suitable projection 2' provided on the external surface of the piece 2 is mounted the coupling ferrule 5 in such a manner as to be capable of rotating, being held in position by means of a nut 6 screwed on the screwthreaded part 2'' of the member 2. The rotating ferrule 5 (see Fig. 2) provided with a handle 5' is formed with an internal mutilated screwthread 5'' of preferably multiple pitch. The removable cup 7, provided with the handle 7', is on its external surface provided with a corresponding screwthread 7'' capable of engaging with the screwthread 5'' of the rotating ferrule 5. The cup 7 has an internal cavity capable of receiving the removable receptacle 8 with the perforated bottom 8', into which the coffee powder is introduced, said receptacle being supported by its upper flange upon a suitable projection of the internal cavity of the cup 7.

According to the present invention and to the example shown on the drawing the receptacle 8 is subdivided into two equal compartments by means of the partition 9 while in the bottom of the removable cup 7 there are provided, corresponding to each compartment, the independent discharge nozzles 10. For the purpose of exactly adjusting the receptacle into the cup 7 so that each compartment of the said receptacle may be exactly superposed to the corresponding discharge nozzle, the partition 9 projects slightly underneath the bottom 8' and engages with a groove 11 provided on the bottom of the cup 7.

The generating group according to the second constructional form as shown in Figs. 4 and 5 is substantially identical to the one of the first form hereinbefore described. The difference consists only in that the partition 9 is constituted by a double wall while the partition 12 projecting from the bottom of the cup 7 engages within the cavity of the double wall 9 and insures the exact adjusting of the receptacle 8.

The working of the improved apparatus hereinbefore described is as follows.

When the desired quantity of coffee powder has been introduced into the receptacle 8 and the latter has been inserted into the cavity provided in the cup 7, the latter is applied against the ferrule 5, by rotating the latter by means of the handle 5', whereby the engagement of the screwthread 5" with the screwthread 7" of the cup 7 is effected, so that the latter is coupled to the ferrule 5 and forced upward until its upper edge and the one of the receptacle 8 fit tightly against the packing 4. Now, hot water and steam under pressure are introduced through the connection 1. The mass of liquid which has traversed the coffee powder and which has been transformed into beverage of coffee leaves the perforated bottom 8' uniformly subdivided into two equal portions, and any one of the said portions leaves separately by the corresponding discharge nozzle 10 and is collected in separate cups arranged underneath the generating group. Owing to this arrangement it is thus possible simultaneously to prepare in one operation only two cups of coffee.

In the example shown in the drawing it has been assumed that the receptacle 8 is subdivided into two compartments only by means of the partition 9 and that the removable cup is provided therefore with two discharge nozzles only. It is obvious, however, that the receptacle may be subdivided into three, four or more equal compartments by means of three, four or more partitions radially disposed while the removable cup may be provided with three, four or more discharge nozzles, thus rendering the generating group capable of simultaneously supplying coffee to three, four or more cups.

I claim:

1. In an infusion apparatus, a connection for the end of a pipe supplying infusion fluid, a removable cup having means for detachably connecting it to said connection and a plurality of discharge nozzles, and a perforated container in said cup having as many compartments as there are nozzles, each compartment arranged to register with a nozzle.

2. In an infusion apparatus, a connection for the end of a pipe supplying hot water or steam, a perforated dispensing plate in the end of said connection, a rotatable ferrule on said connection having a handle, said ferrule having a multiple thread, a cup having a handle, and a plurality of nozzles and a multiple thread for co-action with the first mentioned thread, a partition dividing the cup into as many compartments as there are nozzles, a perforated container within said cup and a packing in the end of said connection against which the edge of the cup is forced by the movement of the ferrule handle.

In testimony that I claim the foregoing as my invention I have signed my name.

NATALE DE MATTEI.